United States Patent [19]

Moren et al.

[11] Patent Number: 5,545,370
[45] Date of Patent: Aug. 13, 1996

[54] PROCESS FOR PRODUCING THERMOFORMED ARTICLE EMPLOYING SELECTIVE COOLING

[75] Inventors: Mike Moren, Wheaton; Todd Buck, Elburn; Pat Kizziah, West Chicago, all of Ill.

[73] Assignee: Plastofilm Industries, Inc., Wheaton, Ill.

[21] Appl. No.: 225,666

[22] Filed: Apr. 11, 1994

[51] Int. Cl.$^6$ ............................ B29C 51/42; B29C 51/10
[52] U.S. Cl. .................... 264/522; 264/322; 264/550; 425/384; 425/387.1
[58] Field of Search ...................... 264/522, 550, 264/551, 291, 292, 322; 425/384, 387.1

[56] References Cited

U.S. PATENT DOCUMENTS

| 3,527,854 | 9/1970 | Martin et al. ........................... 264/522 |
| 4,342,183 | 8/1982 | Gordon et al. ........................... 264/522 |
| 4,381,279 | 4/1983 | Jakobsen et al. ........................ 264/522 |
| 4,909,722 | 3/1990 | Wakayama et al. ..................... 264/522 |

FOREIGN PATENT DOCUMENTS

| 539862 | 5/1993 | European Pat. Off. ............... 264/522 |
| 57-095407 | 6/1982 | Japan ..................................... 264/522 |

*Primary Examiner*—Catherine Timm
*Attorney, Agent, or Firm*—Welsh & Katz, Ltd.

[57] ABSTRACT

A process for producing a thermoformed article having a first portion with a first wall thickness, and a second portion with a second wall thickness, the first portion having a thicker wall thickness than the second portion, the process including selectively cooling the first portion during a thermoforming cycle so that thermoformable material from the first portion is prevented from migrating to the second portion.

3 Claims, 3 Drawing Sheets

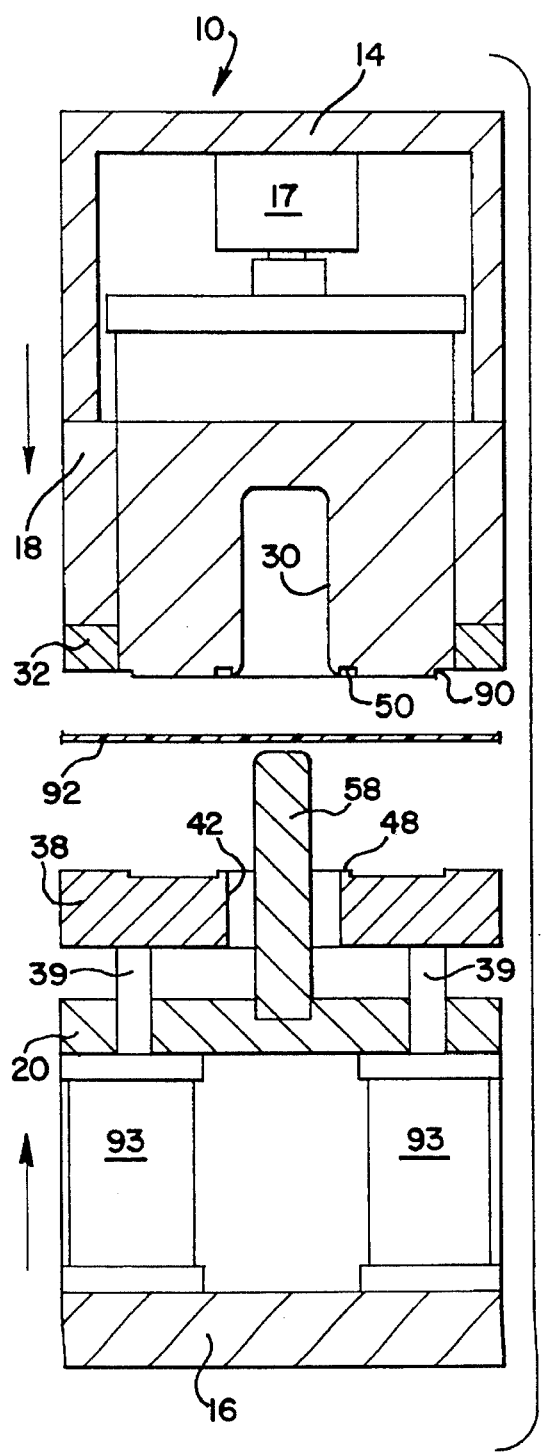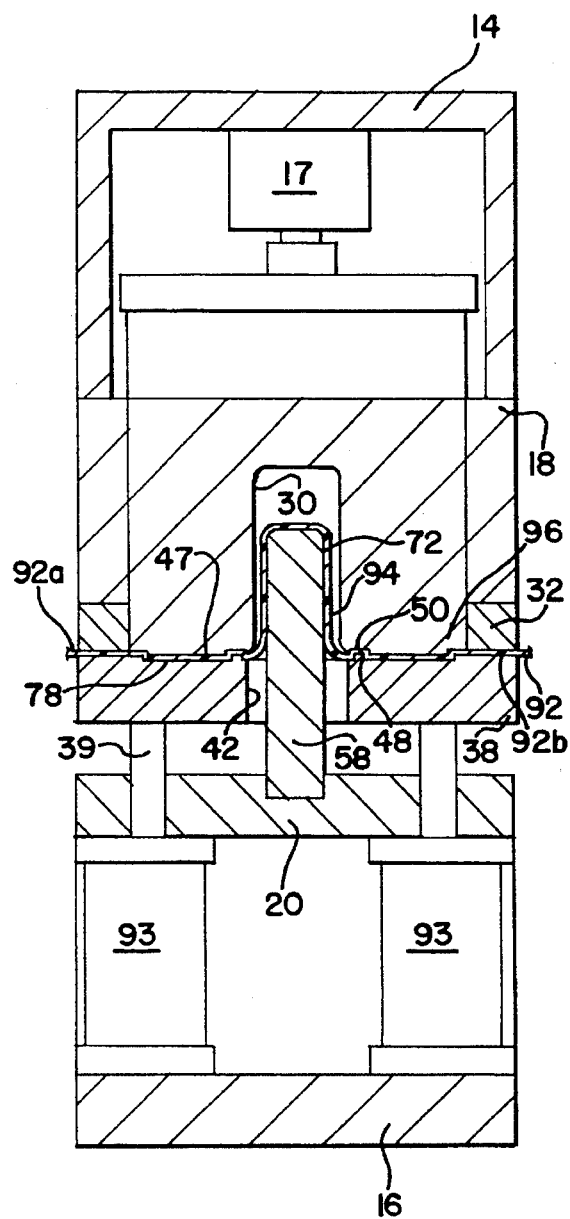

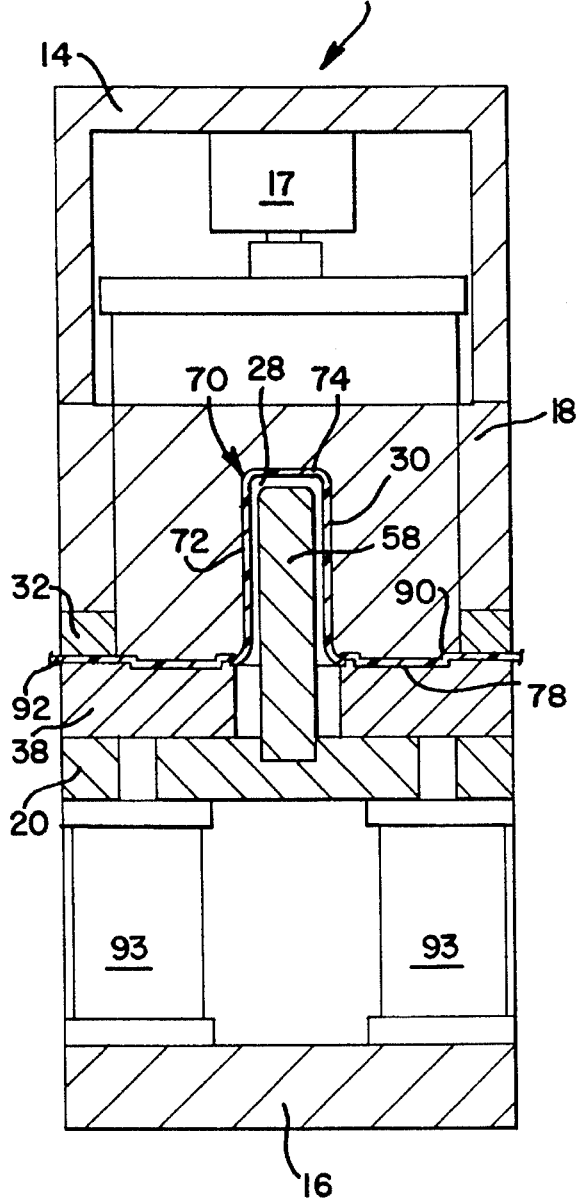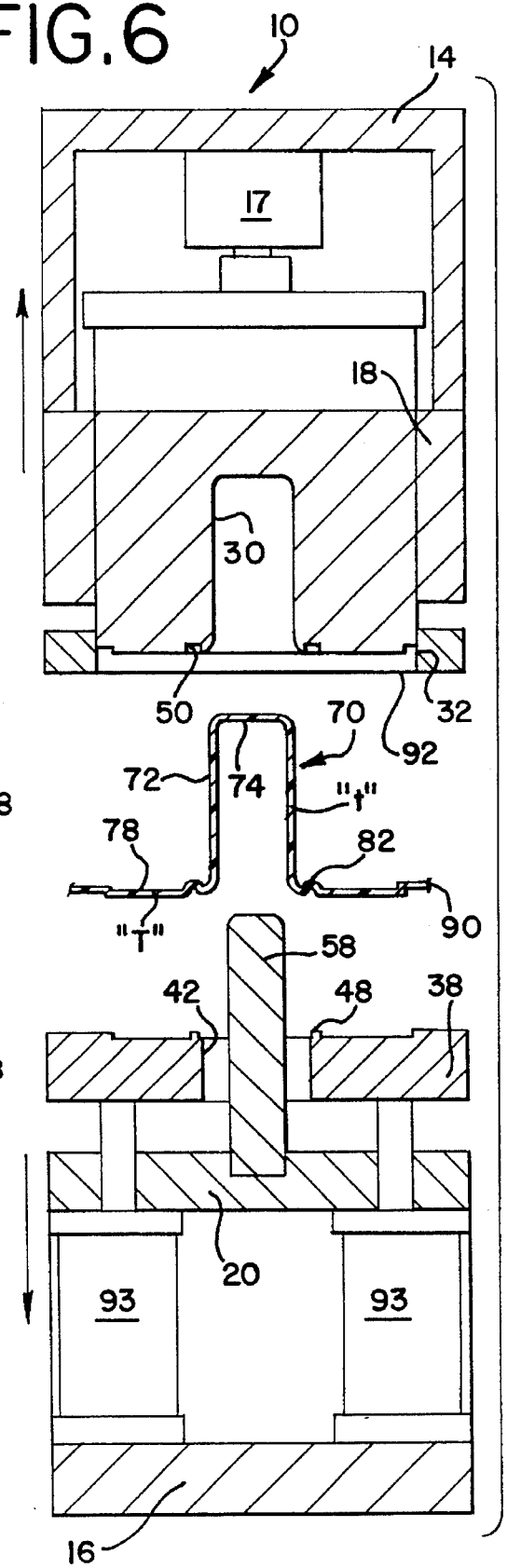

PROCESS FOR PRODUCING THERMOFORMED ARTICLE EMPLOYING SELECTIVE COOLING

BACKGROUND OF THE INVENTION

The present invention relates generally to processes for producing thermoformed articles, and specifically to such a process wherein the articles are produced using selectively applied differences in temperature.

In conventional thermoforming methodology, a sheet of thermoformable material is heated and indexed to be in registry with a thermoforming apparatus. The apparatus includes a cavity having the "female" portion of the mold, and an insert or "male" portion of the mold, wherein the male and female portions are reciprocally movable relative to each other between a vertically displaced or "resting" position, and a matingly engaged or "forming" position. In the forming position, the heated material is thrust into the cavity by the insert to form the desired shape. Often, vacuum and/or air pressure is used to assist the movement of material in the cavity.

Once the product has been formed in the molding apparatus, the insert is vertically displaced from the cavity, and a vertically displaceable stripper component of the cavity forces the release of the product from the cavity. To provide rapid setting of the formed part, and also to prolong the working life of the thermoforming apparatus, cooling galleries are provided to both the insert and the cavity for controlling operational temperature.

In some cases, the wall thickness of a particular thermoformed part is especially critical, and further, there is a need for providing thermoformed parts having some portions with a first wall thickness, and other portions with a second wall thickness. One such part is a disposable handle for hospital operating room light fixtures, which has a generally circular flange or base portion and a closed tubular handle portion projecting axially from the flange portion.

The flange portion should be fairly rigid for proper mounting to the operating room light fixture. Preferably, the handle portion engages the light fixture with a releasable friction fit and is capable of being secured to the fixture by operating room personnel using only one hand. However, the handle portion should be relatively collapsible for compact shipping. One way of providing such a handle is to produce the disposable handle with the handle portion having a much thinner wall thickness than the flange portion.

However, conventional thermoforming apparatus for molding such disposable handles appears to be incapable of accurately regulating the wall thickness of the handle portion relative to the flange portion. It has been found heated thermoforming material migrates from the flange portion to the tip of the handle portion. This defect increases the amount of thermoforming material needed for each article, and the migrating gives the handle portion a thicker wall which reduces the collapsibility of the handle portion.

One attempted solution to the above-identified problem has been to produce the handle portion separately from the flange portion, and to subsequently join the two components together, such as by ultrasonic welding or chemical adhesive. This procedure solves the problem of migration of material to the handle portion, but is costlier in manufacturing time and effort.

Thus, there is a need for a process for producing thermoformed articles, such as disposable operating room light handle covers, wherein the relative thicknesses of the various components are accurately maintained.

Accordingly, a first object of the present invention is to provide a method for producing thermoformed articles in which a first portion of the article has a first wall thickness, and a second portion of the article has a second wall thickness, the first and second wall thicknesses being substantially different from each other.

Still another object of the present invention is to provide a thermoformed article having first and second portions, each with a corresponding wall thickness, wherein the entire article is integrally formed in a single thermoforming cycle.

SUMMARY OF THE INVENTION

Accordingly, the above-identified objects are met or exceeded by the present invention, wherein a process is disclosed for producing a thermoformed article from a sheet of molten thermoforming material to form the article with a first portion with a first wall thickness, and a second portion with a second wall thickness, the first portion having a thicker wall thickness than the second portion. The process includes selectively cooling and pinching the first portion during a thermoforming cycle so that thermoformable material from the first portion is prevented from migrating to the second portion.

In another embodiment, a process for producing thermoformed articles using a thermoforming apparatus including a male mold assist, reciprocally movable relative to a female mold to matingly engage the mold, includes providing a heated sheet of thermoformable material, indexing the sheet in relation to the apparatus, moving the female mold toward a first side of the indexed sheet of material, moving the male assist toward a second side of the indexed sheet, pinching the indexed sheet between portions of the male assist and the female cavity so that a first portion of the sheet is sandwiched between relatively cooler metallic surfaces while a second portion of the indexed sheet is momentarily isolated from the cooler surfaces, thereby remaining heated, and forming a portion of a thermoformed article from second portion of material, while the first portion of the material remains integrally joined to the second portion.

In yet another embodiment, a thermoformed article is disclosed having a first portion with a first wall thickness, and a second portion with a second wall thickness, the first portion having a thicker wall thickness than the second portion, the article produced by a thermoforming process including selectively cooling and pinching the first portion during a thermoforming cycle so that thermoformable material from the first portion is prevented from migrating to the second portion.

BRIEF DESCRIPTION OF THE DRAWINGS

FIG. 3 is a schematic representation of the apparatus of FIG. 1 in a ready position;

FIG. 4 is a schematic representation of the apparatus of FIG. 3 shown in an early phase of the present thermoforming process;

FIG. 5 is a schematic representation of the apparatus of FIG. 4 shown in a later phase of the present thermoforming process; and FIG. 6 is a schematic representation of the apparatus of FIG. 5 shown at the conclusion of the present process.

DETAILED DESCRIPTION OF THE PREFERRED EMBODIMENT

Figure 1:
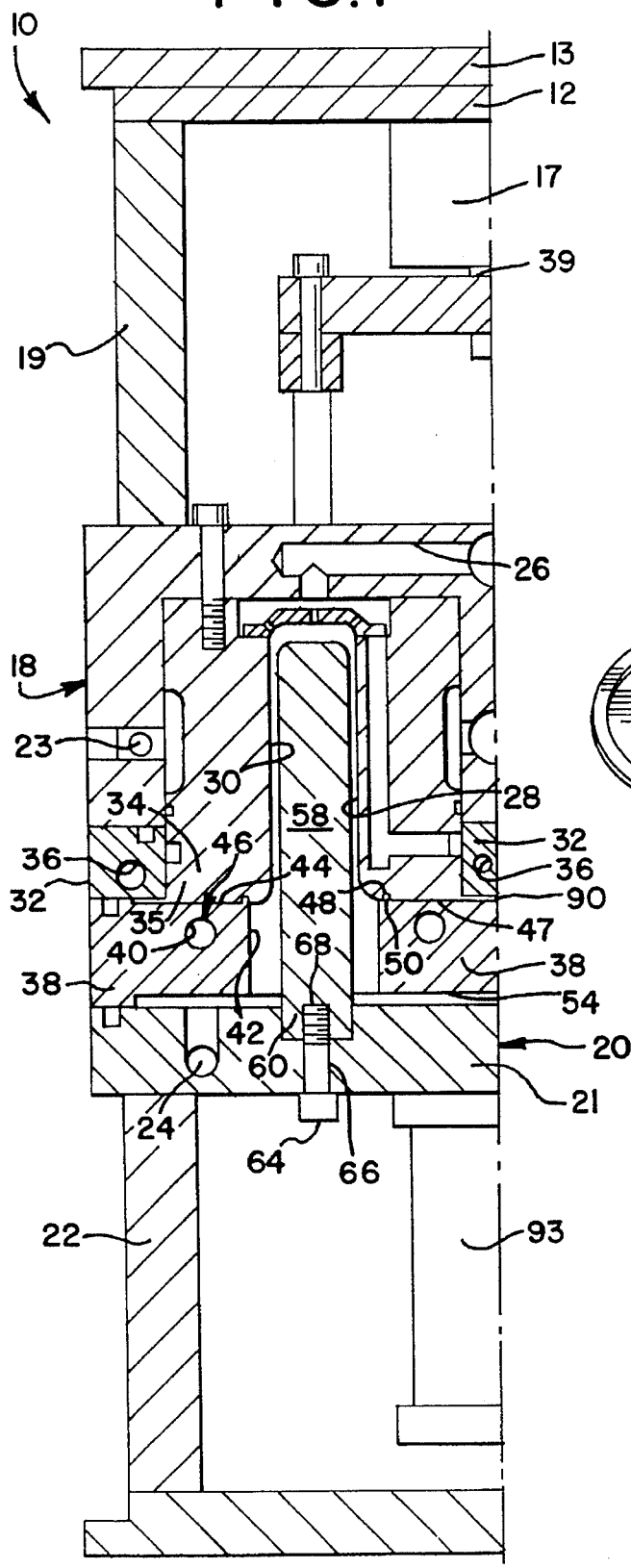
FIG. 1 is a vertical sectional view of the type of thermoforming apparatus suitable for practicing the present process.

Referring now to the drawings, and in particular to FIG. 1, a thermoforming apparatus suitable for practicing the present method is generally designated 10. The apparatus 10 has an upper cap sheet 12 which is attached to an upper frame platen 13 and a lower cap sheet 14 which is attached to a lower frame platen 15. The upper frame platen 13 and lower frame platen 15 form part of a conventional thermoformer (not shown). Each cap sheet 12, 14 is reciprocally movable by the corresponding frame platen 13, 14 which are in turn driven by a plurality of fluid power cylinders (not shown) which may or may not be supplemented by guide rods (not shown), which is a practice well known in the art.

In the preferred embodiment, the apparatus 10 includes an upper "female" portion or mold base half 18 which is releasably mounted to an upper stand off 19 which extends downward from the upper cap sheet 12. A lower assist plate 21, forming a part of an assist half, indicated generally at 20, of the apparatus 10 is releasably mounted to a stand off 22 which extends upward from the lower cap sheet 16. It is contemplated, however, that depending on the application, the directional arrangement of the base mold 18 and assist half 20 may be altered with for example the base mold 18 being the lower half. The base mold 18 is provided with at least one cooling gallery 23 through which water or other fluid is injected. In addition, the assist plate 21 is also provided with at least one cooling gallery 24. The cooling galleries 23, 24 cool the appropriate regions of the base mold 18 and the assist half 20 during the thermoforming process.

The base mold 18 is also preferably provided with a vacuum line 26 bored therein and connected to a remote source of vacuum (not shown) which draws the heated plastic into a cavity 28. The cavity 28 defines the configuration of the exterior of the thermoformed part and includes a central vertical cavity portion 30 which in the preferred embodiment forms the handle of the article as is set forth below.

A stripper 32 surrounds a lower end portion 34 of the base mold 18. The stripper 32 is vertically movable relative to the base mold 18, and is employed to remove thermoformed articles from the cavity 28 at the conclusion of each thermoforming cycle. As is the case with the cavity 18, the stripper 32 is provided with its own cooling gallery 36.

Located below the base mold 18 and the stripper 32, and preferably coaxial therewith, is a clamping plate 38 of the assist half 20. The clamping plate 38 is secured to the lower assist plate 21 of the assist half 20 by piston shafts 39 (best seen in FIG. 3) and is reciprocally movable relative to the assist plate. In addition, the clamping plate 38 preferably has its own cooling gallery 40, and defines a central opening 42 which is in registry with the vertical cavity 30 of the base mold 18. The base mold 18 and clamping plate 38 are preferably formed of a material which is machineable and has a high heat transfer coefficient, such as a metal.

When the base 18 and clamping plate 38 are brought together, an upper surface 44 of the clamping plate 38 and an opposing lower surface 46 of the base mold 18 define a horizontal outer portion 47 (FIG. 4) of the cavity 28 which in the preferred embodiment forms the flange of the article as is set forth below.

The lower surface 46 of the base mold 18 forms an annular groove 48 which circumscribes the vertical cavity 30 and the upper surface 44 of the clamp plate 38 forms a circular clamping or coining ring 50 which is configured to fit within the groove 48 to create a pinched area 52 (FIG. 4) between the horizontal portion 47 and the vertical portion 30 of the cavity 28.

The assist half 20 includes an upward extending substantially cylindrical plug portion 58 attached at a lower end 60 to the assist plate 21. The plug 58 is preferably made of a non-stick, insulating material such as teflon or the like. In the preferred embodiment, the plug portion 58 is secured to the assist by a threaded fastener 64 passing through a through-bore 66 and engaging a threaded counterbore 68 at the lower end 60.

Figure 2:
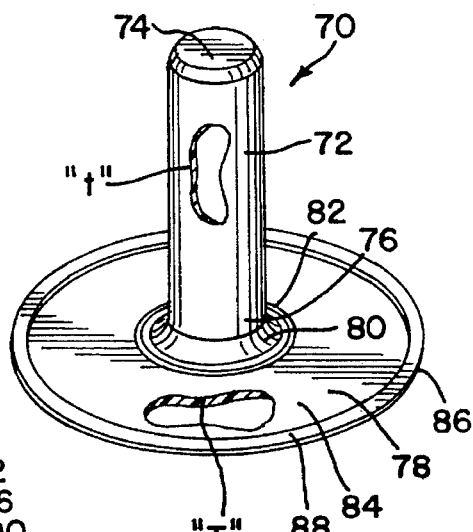
FIG. 2 is a top perspective elevational view of a product produced by the present method.

Referring now to FIG. 2, a preferred article of the type produced according to the present method is generally designated 70. The article 70 is a disposable sterilized cover for a handle of a light fixture of the type used in hospital operating rooms. Included on the article 70 is a generally tubular handle portion 72 having a closed end 74 and an open end 76 opposite the closed end. In the preferred embodiment, the handle portion 72 has a wall thickness, designated 't' which is relatively thin, so as to be flexible and readily collapsible upon the exertion of a vertical force against it. The handle portion 72 is dimensioned to be matingly engaged upon a handle of the operating room fixture.

At the open end 76, the handle portion 72 is integrally joined to a flange portion 78 which extends radially from the handle portion, and is dimensioned to be snap-fit upon the light fixture. In the preferred embodiment, the flange portion 78 has a thickness 'T' which is relatively thicker than the thickness 't' of the handle portion 72. The flange portion 78 includes a radiused transition zone 80 which is bounded at its outer periphery by a vertically projecting annular rib 82. A peripheral zone 84 is defined by the annular rib 82 and the outer peripheral edge 86. If desired, the peripheral edge 86 may be provided with an outer annular rib 88, and referring to FIG. 1, the annular rib 88 may be formed at a step 90 created between the stripper 32 and base mold 18 with the upper surface 44 of the clamping ring configured to fit within the step.

Referring now to FIGS. 3–6, the present process of producing thermoformed articles is illustrated in diagrammatic form. Referring first to FIG. 3, as is well known in the art, a sheet 92 is drawn from a roll (not shown), heated and placed in registry with the apparatus 10. The thermoforming apparatus 10 is depicted in a separated or ready position, wherein the base mold 18 and the stripper 32 are located above the sheet 92 of thermoformable material. The clamping plate 38 and the assist plate 21 of the assist half 20 are located below the sheet of material 92. It will be noted that the clamping plate 38 is vertically displaced from the assist plate 21. This displacement is provided by shafts 39 of pneumatic or other fluid power cylinders 93 as are well known in the art.

Referring now to FIG. 4, the apparatus 10 is shown in an operational or thermoforming position, in which opposing surfaces of the base 18 and the stripper 32 are in a direct opposing relationship, on opposing sides of the sheet 92, from the corresponding portions of the clamping plate 38. More specifically, the upper cap sheet 12 descends, and the lower cap sheet 14 ascends, and the clamping plate 38 comes in contact with a lower surface 92a of the sheet 92 and the stripper 32 and the lower surface 46 of the base mold 18 contact an upper surface 92b of the sheet opposite the clamping plate. Also the coining ring 50 fits within the groove 48 to pinch the sheet 92 and to define and form a seal around a central portion 94 of the sheet which corresponds to the handle portion 72 (FIG. 2) of the article 70.

The plug 58 contacts the central portion 94 of the sheet 92 and displaces the central portion away from the clamping plate 38 to form a "tent" within the central recess 30. Because the plug 58 is composed of an insulating material and by tenting the central portion 94 so that the heated material generally does not come into contact with the base mold 18, the central portion remains generally at the heated temperature.

Since the clamping plate 38, base mold 18 and the stripper 32 are cooled by the respective cooling galleries and are preferably composed of a material with a high heat transfer component, the contact with an outer portion 96 of the sheet 92, extending within the outer portion 47 of the cavity 28, absorbs heat from the outer portion 96. Thus the outer portion 96 of the sheet 92 is chilled relative to the central portion 94 of the sheet 92.

As the plug portion 58 of the assist 20 begins to push the material into the vertical recess 30 of the cavity 18, the hotter central portion 94 begins to form the handle portion 72 (FIG. 2) of the article 70. The chilled outer portion 96 which corresponds to the flange portion 78 of the article becomes relatively rigid during this process.

The pinching of the sheet 92 between the coining ring 50 and groove 48 and the rigidity of the flange portion 78 prevents the migration of material from the flange portion into the handle portion 72, which is a desired feature of the present process.

Referring now to FIG. 5, the remainder of the forming cycle is completed, as the assist plate 21 continues upward relative to both the clamping plate 38 and base mold 18 to contact the clamping plate 38. The cylinders 93 maintain the clamping plate 38 in contacting relationship with the sheet 92 and base 18. As the assist plate 21 continues upward, the plug portion 58 reaches its furthest upward point in the cavity. Vacuum and pressure forces are then used to assist the formation of the part 70, as is well known in the art, by causing the material to contact the interior surface of the base 18 which forms the vertical recess 30 of the cavity 28, with the contact cooling the material. Due to the lack of migration of material from the flange portion 78, the handle portion 72 retains a relatively thinner and more uniform wall thickness, and is relatively more flexible than the flange portion.

Referring now to FIG. 6, at the conclusion of the thermoforming cycle, the upper cap sheet 12 moves upward, and the lower cap sheet 14 moves downward, separating the base mold 18 from the assist portion 20. Similarly, the contacting relationship between the clamping plate 38 and both the stripper 32 and the base mold 18 is terminated through this separation. As the components separate, the stripper 32 moves downward slightly, and forces the thermoformed article 70 from the mold cavity 28.

Accordingly, it will be seen that the present process produces thermoformed articles having a first portion which is relatively flexible and collapsible relative to a second portion, and where the first portion has a wall thickness relatively thinner than the wall thickness of the second portion. Further, due to the selective application of cooling, the second portion is maintained at a cooler temperature than the first portion, and migration of material from the second portion to the first portion is prevented. Specifically, when the thermoformed article takes the form of disposable operating room light fixture handle covers made according to the present process, the handle portion 72 is relatively flexible and collapsible relative to the rigid flange portion 78, which facilitates shipping and handling, as well as the mounting of the handle portion upon the light fixture handle. The use of selective cooling and clamping prevents material migration to the handle portion, and permits a unitary article to be produced from a single thermoforming cycle.

While a particular embodiment of the present process for producing thermoformed articles employing selective cooling has been shown and described, it will be appreciated by those skilled in the art that changes and modifications may be made thereto without departing from the invention in its broader aspects and as set forth in the following claims.

What is claimed is:

1. A process for producing a thermoformed article from a sheet of thermoformable material, said article having a first portion with a first wall thickness, and a second portion with a second wall thickness, said first portion having a thicker wall thickness than said second portion, said first portion and second portion separated along a boundary, said process comprising:

heating said sheet of material until said sheet is malleable;

selectively cooling said first portion so that said thermoformable material from said first portion is prevented from migrating to said second portion;

forming a pinched area defined by a groove in said sheet along said boundary between said first portion and said second portion, said pinched area further preventing migration of said material between said first and second portions; and thermoforming said second portion into a thermoformed article.

2. The process as defined in claim 1 further including forming said article such that said first portion and said second portion are integrally formed during said process.

3. The process as defined in claim 1 further including providing said first portion with a substantially horizontal flattened configuration, and providing said second portion with a substantially vertical tubular configuration.

* * * * *